United States Patent [19]

Honda

[11] 4,002,134
[45] Jan. 11, 1977

[54] AQUA-PLANING VEHICLE

[76] Inventor: Kuraji Honda, 129 Kita-Kakigase, Gifu, Gifu, Japan

[22] Filed: Apr. 8, 1976

[21] Appl. No.: 675,130

[30] Foreign Application Priority Data

Mar. 12, 1976 Japan .................. 51-29999[U]

[52] U.S. Cl. .................. 114/271; 115/1 R; 115/19
[51] Int. Cl.$^2$ .................. B63B 1/18
[58] Field of Search .................. 115/1 R, 1 A, 19; 114/67 R, 66.5 R, 66.5 F, 66.5 H, 61; 9/310 B; 272/1 B

[56] References Cited

UNITED STATES PATENTS

| | | | |
|---|---|---|---|
| 1,964,452 | 6/1934 | Cisneros | 115/19 |
| 2,341,109 | 2/1944 | McLarty | 115/1 R |
| 3,237,582 | 3/1966 | Sturgeon et al. | 114/66.5 H |

*Primary Examiner*—Trygve M. Blix
*Assistant Examiner*—Sherman D. Basinger
*Attorney, Agent, or Firm*—George B. Oujevolk

[57] ABSTRACT

An aqua-planing vehicle has freely rotatable buoyant wheels at both sides of the front and rear ends of a rectangular base frame so that the watercraft can float on a lake or ocean surface. The watercraft propelling member such as a screw is driven by a power source such as an engine mounted on the frame so that the aqua-planing vehicle can plane on the water surface at high speed. Wing members are arranged aslant above the frame such that they receive air on their undersides during travel of the watercraft so that the craft is endowed with buoyancy by virtue of air resistance, to thereby reduce water resistance and allow smooth and high-speed planing of the watercraft on the water surface. Provided aslant below the frame are high-glide impellers arranged such that they can be pushed down by an operating pedal. Thus, when the operator steps on the operating pedal during travel of the aqua-planing vehicle, the impellers are pushed down to strike the water surface, forcing the planing watercraft to bounce up above the water surface. Buffer members are provided on both sides of a lower portion of the frame so as to lessen the impact when the craft which has bounced up lands down again on the water surface.

7 Claims, 8 Drawing Figures

U.S. Patent    Jan. 11, 1977    Sheet 2 of 2    4,002,134
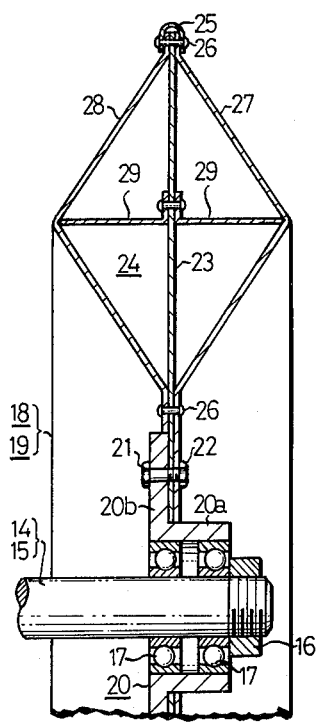
FIG. 3
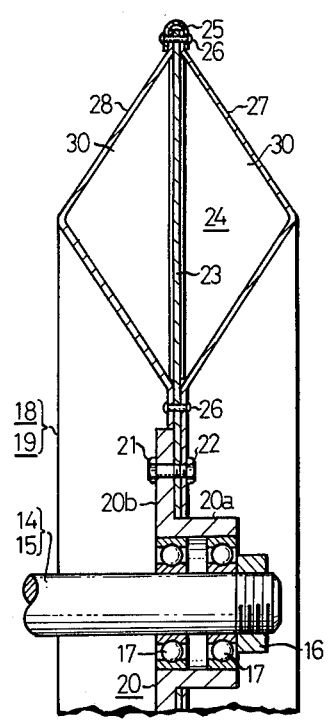
FIG. 4
FIG. 5
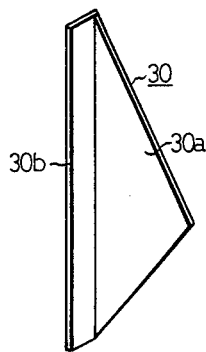
FIG. 6
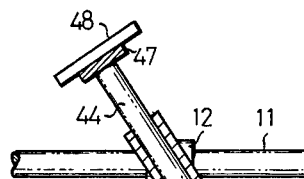
FIG. 7
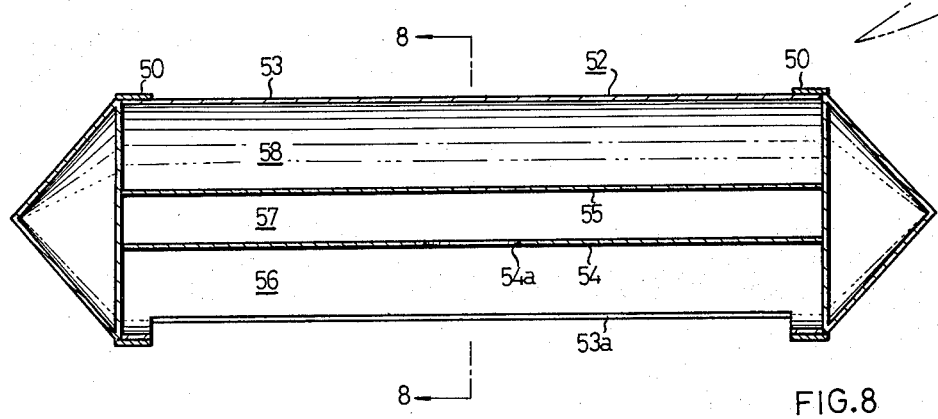
FIG. 8
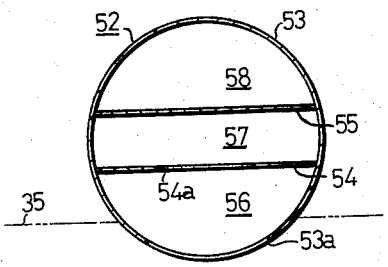

AQUA-PLANING VEHICLE

This invention relates to an aqua-planing vehicle, and more particularly to an aqua-planing vehicle which can float and plane at high speed on a water surface such as a lake or sea surface and which, if so desired, can jump to a gliding position high above the water surface so that the rider can enjoy the experience of water surface gliding.

An object of the present invention is to provide an aqua-planing vehicle featuring the provision of slant wing members above the base frame adapted so that such wind members receive air on their undersides while the watercraft travels to thus provide the craft with buoyancy produced by air resistance, allowing the craft to plane at high speed on the water surface with reduced water resistance.

Another object of the present invention is to provide an aqua-planing vehicle of the type in which the rider in stepping on the operating pedal during running of the watercraft, causes high-glide impellers provided aslant below the frame to be pushed down so as to strike the water surface in order to develop a repulsive force whereby the aqua-planing vehicle planing forward at high speed is sprung up high above the water surface, thus allowing the rider to enjoy the thrilling experience of water surface gliding.

Still another object of the present invention is to provide an aqua-planing vehicle in which impact upon the water surface following a leap is lessened by buffer members provided on both sides of a lower portion of the craft frame to prevent such accidents as turnovers and ensure safe use of the watercraft.

The other objects and features of this invention will become apparent from a consideration of the following detailed description of the preferred embodiments of the invention and the appended claims. Also, many benefits of this invention which are not mentioned in this specification will be readily understood by those skilled in the art when the concept of this invention is implemented.

Now the structural features of an aqua-planing vehicle embodying the present invention are described in detail with reference to the accompanying drawings, in which:

FIG. 3 is a fragmental enlarged longitudinal sectional view showing the details of the structural arrangement of a buoyant wheel adapted in the water cycle shown in FIG. 1;

FIG. 4 is a view similar to FIG. 3 but showing the detailed structural arrangement of a buoyant wheel which is somewhat different in construction from that shown in FIG. 3;

FIG. 5 is a perspective view of a reinforcing member employed in the buoyant wheel shown in FIG. 4;

FIG. 6 is a partial enlarged longitudinal sectional view showing the details of the structural arrangement of a high-glide impeller used in the aqua-planing vehicle shown in FIG. 1;

FIG. 7 is a partial enlarged longitudinal sectional view showing the details of the structural arrangement of a buffer member used in the aqua-planing vehicle shown in FIG. 1; and FIG. 8 is a sectional view taken along the line 8—8 of FIG. 7.

Figure 1:
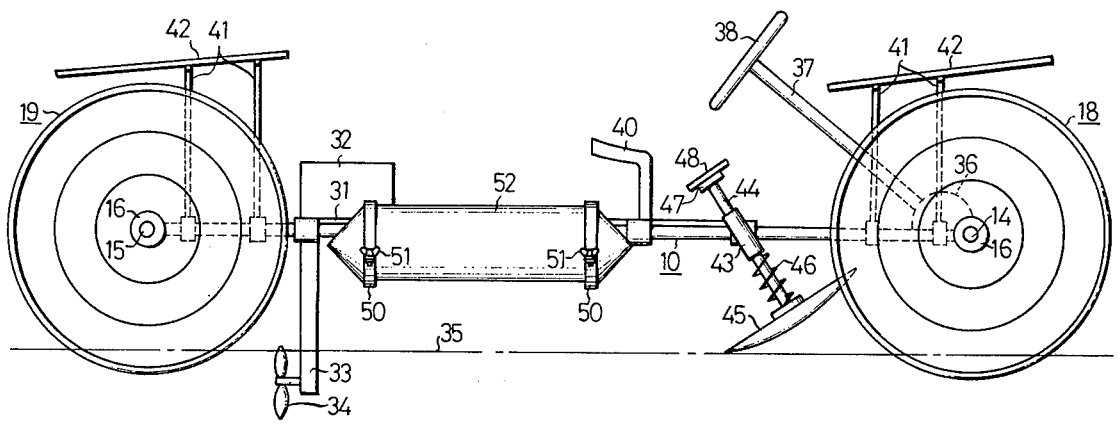
FIG. 1 is a side elevational view of an aqua-planing vehicle embodying the present invention.

Referring generally to the drawings, the frame 10 which constitutes the support base of the watercraft of this invention is rectangular in shape and formed from a combination of several pipes 11 and couplings 12. Projecting from both side edges of the front end of said frame 10 are supporting shafts 14 arranged movable through respective rotative members 13, while fixed supporting shafts 15 project from both side edges of the rear end of the frame. At the ends of said movable supporting shafts 14 and fixed supporting shafts 15 are rotatably mounted a pair of front buoyant wheels 18 and a pair of rear buoyant wheels 19, respectively, by means of nuts 16 through bearings 17. As best shown in FIG. 3, each of said buoyant wheels 18, 19 consists of a fixing member 20 formed with a bearing portion 20a, a disc-shaped support plate 23 secured to the peripheral flanged portion 20b of said fixing member 20 by a plurality of bolts 21 and nuts 22, and a pair of annular sealing members 27, 28 secured to both sides of said support plate 23 by a ring-shaped clip 25 and a plurality of pins 26 so as to form a sealed annular air chamber 24 which is rhombic in sectional shape and holds said support plate 23 centrally therein. In this embodiment, annular reinforcing members 29 are secured between both sides of said support plate 23 and the inner faces of said sealing members 27, 28 so that said reinforcing members are positioned substantially centrally in said annular air chamber 24 to thereby keep said annular air chamber 24 from being deformed upon receiving an external force.

Said both front buoyant wheels 18 and rear buoyant wheels 19 may be constructed as shown in FIGS. 4 and 5 instead of employing the arrangement described above and shown in FIG. 3. The structural arrangement of this different embodiment of the buoyant wheels, as signified by similar reference numerals 20 – 28, is substantially identical with that of the buoyant wheels shown in FIG. 3, with the only difference lying in the construction of the reinforcing members. That is, each of the reinforcing members 30 used in this embodiment, as apparent from FIG. 5, consist of a triangular flat plate portion 30a and an abutment portion 30b formed at the base of said flat plate portion, and such reinforcing members are fixedly provided at several locations in the annular air chamber 24 on both sides of the support plate 23 as shown in FIG. 4.

Figure 2:
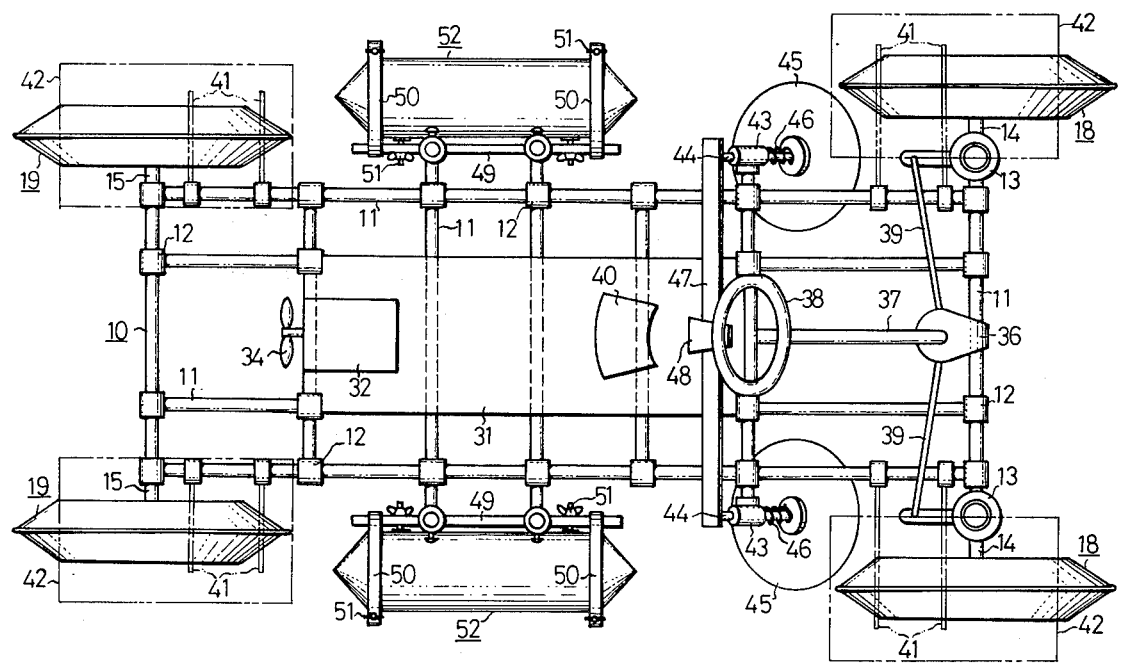
FIG. 2 is a top plan view thereof.

Provided on the frame 10 substantially centrally thereof is a base plate 31 which carries an engine 32 at its rear end as shown in FIG. 2. Extending downward from the underside of the frame 10 below said engine 32 is a supporting bar 33 which has secured to the rear side of its end a screw 34 which is driven by said engine 32. Thus, it will be understood that said frame 10 floats on lake or ocean water surface 35 with the aid of buoyant wheels 18, 19 as shown in FIG. 1 and is propelled forward at high speed on the water surface 35 with rotation of the screw 34 driven by said engine 32. Substantially centrally of the front end of said frame 10 is mounted a direction changer 36 from which a steering shaft 37 extends aslant upward and rearward of said mechanism, and a steering handle 38 is set at the upper end of said shaft 37. Extending sidewise from both sides of said direction changer 36 are connecting rods 39 which are joined at their opposite ends to the proximal portions of the movable supporting shafts 14 which support the respective front buoyant wheels 18. It will be also seen that an operator's seat 40 is provided to the rear of said steering handle 38 and substantially centrally of the base plate 31. Thus, when the operator seated on this operator's seat 40 turns the steering handle 38, the movable supporting shafts 14 are operated by said direction changer 36 through the connecting rods 39, causing the front buoyant wheels 18 to tilt relative to the direction of movement to effect a change in the planing direction of the watercraft.

Flat plate-shaped wing members 42 are disposed above the frame 10 through several outwardly curved mounting rods 41 such that said wing members are positioned just above said both front and rear buoyant wheels 18 and 19. As apparent from FIG. 1, these wing members 42 are inclined at a suitable angle (about 10° to 40°) upwardly in the direction of advancement of the watercraft so that they receive air on their undersides while the watercraft runs. Thus, when these wing members 42 receive air at their undersides during travel of the watercraft, the craft is endowed with buoyancy by virtue of air resistance. This lessens the water resistance which the craft is subject to and allows smooth high-speed planing on to water surface 35.

To the rear of said front floating wheels 18 and on both sides of the frame 10 are secured a pair of inclined supporting cylinders 43 in each of which an operating shaft 44 is fitted and vertically movable, and a disc-shaped high-glide impeller 45 is secured to the lower end of each said operating shaft 44. Each said member 45, as shown in detail in FIG. 6, is upwardly inclined at a suitable angle (about 30° to 45° relative to the water surface 35) in the direction of advancement of the craft and so designed as to strike the water surface 35 as the operating shaft 44 moves downward. A tension spring 46 is interposed between said high-glide impeller 45 and supporting cylinder 43 so that said member 45 is normally retained at its upper position by the action of said spring 46, as shown by the solid line in FIG. 6. Passed between the upper ends of said both operating shafts 44 and positioned above the frame 10 is a connecting bar 47, and a steering pedal 48 for moving said high-glide impeller downwardly toward the water surface 35 is provided substantially at the middle of said connecting bar 47 as shown. Thus, if the operator at the operator's seat 40 steps on the steering pedal 48 during travel of the watercraft, said both members 45 are pushed down forwardly against the action of the tension spring 46 to strike against the water surface 35 and produce a repulsive force which causes the watercraft to bounce up high above the water surface 35 while planing forwardly at high speed.

Provided in front of said respective rear buoyant wheels 19 and on both sides of the frame 10 are a pair of parallel-arranged fixing members 49, and a pair of buffer members 52 are secured on the outside of said respective fixing members 49 by means of fixing bands 50 and nuts 51. Each of said buffer members 52, as shown in detail in FIGS. 7 and 8, comprises a cylindrical casing 53 formed with an opening 53a at its lower end, a lower partition plate 54 disposed horizontally in and slightly below the center of said casing 53 and also formed with a communicating hole 54a in its center, and an upper partition plate 55 also disposed horizontally in but slightly above the center of said casing 53 with a predetermined space from said lower partition plate 54. These partition plates defined in said casing 53 a pressure receiving chamber 56 which opens downward from said opening 53a, a pressure elevating chamber 57 disposed above said chamber 56 and communicated therewith through said communicating hole 54a, and a sealed air chamber 58 disposed thereabove. Therefore, when the aqua-planing vehicle which has bounced up with depression of the steering pedal 48 lands on the water surface 35, with release of said depression the frame 10 comes closer to the water surface 35 than during normal planing, and the opening 53a formed in the lower part of the casing 53 of each buffer member 52 is submerged in water as shown in FIG. 8, so that air in the pressure receiving chamber 56 is compressed and forced into the pressure elevating chamber 57 from the communicating hole 54a to elevate pressure in said both chambers 56, 57, thereby easing the impact and at precluding the danger of untoward events such as overturn of the craft.

Explanation will now be directed toward the operation of the aqua-planing vehicle vast described.

This aqua-planing vehicle, as stated before, can float while maintaining a horizontal position on a lake, ocean or other water surface 35 as shown in FIG. 1 as annular air chambers 24 are formed in the front and rear buoyant wheels 18 and 19. Under this condition, if the operator takes the operator's seat and starts the engine 32, the screw 34 provided below the frame 10 starts to rotate to propel the watercraft forward at high speed on the water surface 35. Then, if the operator turns the steering handle 38 while the craft is travelling, the movable supporting shafts 14 are operated by the direction changer 36 through connecting rods 39, causing the front buoyant wheels 18 to tilt against the direction of advancement to change the direction of movement of the watercraft. Also, as wing members 42 are provided aslant above the respective front and rear buoyant wheels 18 and 19 and such wing members receive air at their undersides during running of the watercraft, the craft body is endowed with buoyancy owing to air resistance, thus lessening water resistance the craft is subject to and allowing smooth high-speed planing on the water surface 35.

If the operator steps on the steering pedal 48 during such high speed planing of the acqua-planing vehicle, a pair of high-glide impellers 45 provided on both sides of a lower portion of the frame 10 are pushed down against the action of the tension springs 46 to strike the water surface 35 as shown by the broken line in FIG. 6. Consequently, repulsive force is exerted against the body of the aqua-planing vehicle causing it to jump up high above the water surface 35 while continuing to plain forward at high speed. Then, when the operator releases pressure on the steering pedal 48, each said high-glide impeller 45 is forced upward and back by the action of the tension spring 46 to return to its upper position shown by the solid line in FIG. 6, whereby the acqua-planing vehicle which has thus jumped up is urged to fall down again on to the water surface 35. Thus, if the operator repeats the operation of appling and releasing pressure on the steering pedal 48, the watercraft jumps up repetitively above the water surface 35 while gliding forward on the water surface at high speed, allowing the rider to enjoy water surface gliding.

Further, when the aqua-planing vehicle lands again on the water surface 35 after a jump, the frame 10 comes closer to the water surface 35 than during normal planing and the opening 53a formed in the lower portion of the casing 53 of each buffer member 52 is submerged in water as shown in FIG. 8, so that air in the pressure receiving chamber 56 is compressed and flows into the pressure elevating chamber 57 from the communicating hole 54a to elevate pressure in said both chambers 56, 57 to thereby lessen the impact produced at the time of landing of the watercraft. This makes it possible to prevent any serious accident such as overturn of the craft and to use the craft with safety. Even if the watercraft should tilt to the left or right when returning to the water surface 35, balance is maintained by the action of left and right buffer members 52 enabling the craft to be safely utilized. Also, in case the aqua-planing vehicle lands so vigorously after a jump that said air chambers 58 are submerged in water, the sealed air chamber 58 formed in each said buffer member 52 exhibits its buffer effect with elevation of pressure in said both pressure receiving chamber 56 and pressure elevating chamber 57. Even should the sealed condition of the annular air chambers 24 provided in the front and rear buoyant wheels 18 and 19 breakdown during travel of the aqua-planing vehicle, the aqua-planing vehicle is floated on the water surface 35 by the action of said sealed air chambers 58 in said respective buffer members 52, thus precluding any danger of submersion of the aqua-planing vehicle and ensuring safe use thereof.

As described above, the aqua-planing vehicle of this invention features provision of wing members above the base frame with an upward inclination in the direction of advancement such that said wing members will receive air at their undersides during travel of the watercraft so as to provide it with by way of air resistance, thereby allowing smooth and high speed planing of the aqua-planing vehicle on the water surface with reduced water resistance. This aqua-planing vehicle also features high-glide impellers provided below the frame so as to be movable vertically and with an upward slant in the direction of advancement, whereby when the operator steps on the steering pedal during travel of the watercraft, said high-glide impellers are pushed downward to strike the water surface to consequently develop a repulsive force causing the forward planing watercraft to bounce up high above the water surface, thus allowing the rider to enjoy water surface gliding. Another feature of this invention is provision of buffer members on both sides of a lower portion of the frame, whereby when the aqua-planing vehicle impacts upon the water surface after a jump, the impact or shock is lessened by said buffer members to protect the watercraft against danger of accidents such as overturn.

While the present invention has been described in detail by way of some preferred embodiments thereof, it is obvious that the invention may be embodied in many other varieties without departing from the scope and spirit of the invention, and therefore it should be understood that the scope of the invention is not restricted to the particular embodiments shown and described hereinabove but is limited only by the claims which follow.

What I claim is:

1. An aqua-planing vehicle comprising:
    a base frame mounted with a pair of freely rotatable buoyant wheels on both sides of the front and rear ends of the frame so that said frame can float on a water surface;
    means for propelling the frame forward on the water surface;
    a steering handle connected to the buoyant wheels on both sides of the front end of the frame for changing the direction of movement of said frame;
    wing members disposed above the frame and slanted upward in the direction of advancement;
    high-glide impellers provided below the frame so as to be vertically movable and slanted upward in the direction of advancement;
    a steering pedal operatively connected to said high-glide impellers for moving said members downward to strike the water surface to thereby cause the frame to bounce upward during forward movement of the frame; and
    buffer members provided on both sides of a lower portion of the frame for easing the impact exerted upon the frame when it lands and impacts on the water surface after a bounce.

2. An aqua-planing vehicle as claimed in claim 1, wherein the frame is constituted from a combination of pipes and joints.

3. An aqua-planing vehicle as claimed in claim 1, wherein the propelling means is a screw driven by an engine.

4. An aqua-planing vehicle as claimed in claim 1, wherein at least one wing member is provided above each of the buoyant wheels.

5. An aqua-planing vehicle as claimed in claim 1, wherein each of the high-glide impellers is disc shaped and normally retained at its upper position by the action of spring means.

6. An aqua-planing vehicle as claimed in claim 1, wherein each of the buffer members comprises a pressure receiving chamber opened downward and a pressure elevating chamber disposed above said pressure receiving chamber in communication therewith.

7. An aqua-planing vehicle as claimed in claim 6, wherein each buffer member further includes a sealed air chamber disposed above said pressure elevating chamber.

* * * * *